US011880371B2

(12) United States Patent
Faerber et al.

(10) Patent No.: US 11,880,371 B2
(45) Date of Patent: *Jan. 23, 2024

(54) UNIFIED TABLE QUERY PROCESSING

(71) Applicant: SAP SE, Walldorf (DE)

(72) Inventors: Franz Faerber, Walldorf (DE); Juchang Lee, Seoul (KR); Ivan Schreter, Malsch (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/065,187

(22) Filed: Dec. 13, 2022

(65) Prior Publication Data

US 2023/0113142 A1 Apr. 13, 2023

Related U.S. Application Data

(63) Continuation of application No. 17/220,556, filed on Apr. 1, 2021, now Pat. No. 11,567,942, which is a
(Continued)

(51) Int. Cl.
*G06F 16/2455* (2019.01)
*G06F 16/24* (2019.01)
(Continued)

(52) U.S. Cl.
CPC ...... *G06F 16/24561* (2019.01); *G06F 16/213* (2019.01); *G06F 16/221* (2019.01);
(Continued)

(58) Field of Classification Search
CPC .................................................. G06F 16/24561
(Continued)

(56) References Cited

U.S. PATENT DOCUMENTS 5,204,958 A 4/1993 Cheng et al.
5,359,724 A * 10/1994 Earle ........................ G06F 40/18
711/E12.003
(Continued)

FOREIGN PATENT DOCUMENTS

| JP | 2010539616 A | 12/2010 |
|---|---|---|
| JP | 2011209807 A | 10/2011 |
| WO | WO-2011/144382 A1 | 11/2011 |

OTHER PUBLICATIONS

"SanssouciDB: An In-Memory Database for Processing Enterprise Workloads", 2011, Flasso Plattner (hereisafter Plattner (Year: 2011).*
(Continued)

*Primary Examiner* — Muluemebet Gurmu
(74) *Attorney, Agent, or Firm* — Mintz Levin Cohn Ferris Glovsky and Popeo, P.C.

(57) ABSTRACT

A system and method of query processing in a multi-level storage system having a unified table architecture. A query is received by a common query execution engine connected with the unified table architecture, the query specifying a data record. The common query execution engine performs a look-up for the data record based on the query at the first level storage structure. If the data record is not present at the first level storage structure, the common query execution engine performs separate look-ups in each of the second level storage structure and the main store.

20 Claims, 12 Drawing Sheets

Related U.S. Application Data continuation of application No. 15/260,175, filed on Sep. 8, 2016, now Pat. No. 11,003,665, which is a continuation of application No. 13/843,898, filed on Mar. 15, 2013, now Pat. No. 9,465,844.

(60) Provisional application No. 61/646,162, filed on May 11, 2012, provisional application No. 61/640,689, filed on Apr. 30, 2012.

(51) Int. Cl.
*G06F 16/21* (2019.01)
*G06F 16/22* (2019.01)

(52) U.S. Cl.
CPC .......... *G06F 16/24* (2019.01); *G06F 16/2455* (2019.01); *G06F 16/2456* (2019.01)

(58) Field of Classification Search
USPC ....................................................... 707/693
See application file for complete search history.

(56) References Cited

U.S. PATENT DOCUMENTS

| | | |
|---|---|---|
| 5,416,857 A | 5/1995 | Chen et al. |
| 5,630,093 A | 5/1997 | Holzhammer et al. |
| 5,790,857 A | 8/1998 | Clifford et al. |
| 6,629,264 B1 | 9/2003 | Sicola et al. |
| 6,845,375 B1 | 1/2005 | Sinclair |
| 7,672,981 B1 | 3/2010 | Faibish et al. |
| 7,868,789 B1 | 1/2011 | Binnig et al. |
| 7,882,086 B1 | 2/2011 | Wang et al. |
| 8,108,361 B2 | 1/2012 | Netz et al. |
| 8,359,316 B2 | 1/2013 | Franke et al. |
| 8,595,248 B2 | 11/2013 | Ganesh et al. |
| 9,165,010 B2 | 10/2015 | Faerber et al. |
| 9,171,020 B2 | 10/2015 | Faerber et al. |
| 2002/0032018 A1 | 3/2002 | Morton et al. |
| 2002/0072658 A1 | 6/2002 | Rice et al. |
| 2004/0034619 A1 | 2/2004 | Lu et al. |
| 2005/0192998 A1 | 9/2005 | Dittrich et al. |
| 2005/0262136 A1 | 11/2005 | Lloyd et al. |
| 2006/0155915 A1 | 7/2006 | Pereira |
| 2006/0173833 A1 | 8/2006 | Purcell et al. |
| 2009/0313309 A1 | 12/2009 | Becker et al. |
| 2010/0223237 A1 | 9/2010 | Mishra et al. |
| 2010/0278446 A1* | 11/2010 | Ganesh ............... G06F 16/221 382/243 |
| 2011/0016157 A1* | 1/2011 | Bear ................... G06F 16/22 707/804 |
| 2011/0082855 A1* | 4/2011 | Al-Omari ........... G06F 16/2246 707/715 |
| 2011/0161379 A1 | 6/2011 | Grund et al. |
| 2011/0208940 A1 | 8/2011 | Naganuma et al. |
| 2011/0213775 A1 | 9/2011 | Franke et al. |
| 2011/0274170 A1 | 11/2011 | Paz |
| 2012/0072656 A1 | 3/2012 | Archak et al. |
| 2012/0259809 A1 | 10/2012 | Hermann et al. |
| 2013/0073530 A1 | 3/2013 | Faerber et al. |
| 2013/0082991 A1 | 4/2013 | Lin |

OTHER PUBLICATIONS

Extended European Search Report dated Sep. 27, 2013, issued by the European Patent Office for EP application No. 13002237.9.

Spillane et al. "An Efficient Multi-Tier Tablet Server Storage Architecture." *Cloud Computing.* ACM. New York. (Oct. 26, 2011):1-14.

Stonebraker. "Managing Persistent Objects In A Multi-Level Store." *Sigmod Record USA.* vol. 20. No. 2 (1991);2-11.

Li, et al., Test data compression using dictionaries with selective entries and fixed-length indices, ACM Transactions on Design Automation of Electronic Systems, 2003, pp. 470-490, vol. 8, No. 4.

Murthy, et al., Bitmask-based control word compression for NISC architectures, GLSVLSP, 2009, 6 pages.

Plattner, SanssouciDB: An in-memory database for processing enterprise workloads, BTW, 2011, 20 pages.

* cited by examiner

UNIFIED TABLE QUERY PROCESSING

CROSS REFERENCE TO RELATED APPLICATIONS

This application is a continuation of U.S. patent application Ser. No. 17/220,556 filed Apr. 1, 2021, entitled "UNIFIED TABLE QUERY PROCESSING," which is a continuation of U.S. patent application Ser. No. 15/260,175 filed on Sep. 8, 2016, now U.S. Pat. No. 11,003,665, entitled "UNIFIED TABLE QUERY PROCESSING," which is a continuation of U.S. patent application Ser. No. 13/843,898 filed on Mar. 15, 2013, now U.S. Pat. No. 9,465,844, entitled "UNIFIED TABLE QUERY PROCESSING," which claims the benefit of priority under 35 U.S.C. § 119 to U.S. Provisional Application Ser. No. 61/640,689, filed Apr. 30, 2012, entitled FIXED STRING DICTIONARY and under U.S. Provisional Application Ser. No. 61/646,162, filed May 11, 2012 entitled UNIFIED TABLE USING MULTI-LEVEL STORAGE ARCHITECTURE the disclosures of which are incorporated herein by reference.

TECHNICAL FIELD

The subject matter described herein relates to data management of an in-memory database using a unified table architecture having multi-level storage, and more particularly to a system and method for unified query processing.

BACKGROUND

Data management in modern business applications is one of the most challenging topics in today's software industry. Not only is data driving today's business but also provides the foundation for the development of novel business ideas or business cases. Data management in all the different flavors has become a core asset for every organization. Also, data management has gained significant attention at senior management level as the core tool to drive and develop the current business. On the system side, data management scenarios have become extremely complex and complicated to manage. An efficient, flexible, robust, and cost-effective data management layer is the core for a number of different application scenarios essential in today's business environments.

Initially, classical enterprise resource planning (ERP) systems were implemented as the information processing backbone that handles such application scenarios. From the database system perspective, the online transactional processing (OLTP) workload of ERP systems typically requires handling of thousands of concurrent users and transactions with high update load and very selective point queries. On the other hand, data warehouse systems—usually considered as the counterpart to OLTP—either run aggregation queries over a huge volume of data or compute statistical models for the analysis of artifacts stored in the database. Unfortunately, applications like real time analysis to identify anomalies in data stream or ETL/information integration tasks add to the huge variety of different and in some cases absolutely challenging requirements for a data management layer in the context of modern business applications.

Some have postulated that traditional database management systems are no longer able to represent the holistic answer with respect to the variety of different requirements. Specialized systems will emerge for specific problems. Large data management solutions are now usually viewed as a zoo of different systems with different capabilities for different application scenarios. For example, classic row-stores are still dominating the OLTP domain. Maintaining a 1:1-relationship between the logical entity and the physical representation in a record seems obvious for entity-based interaction models. Column-organized data structures gained more and more attention in the analytical domain to avoid projection of queried columns and exploit significantly better data compression rates. Key-value stores are making inroads into commercial data management solutions to cope not only with "big data"-volumes but also provide a platform for procedural code to be executed in parallel. In addition, distributed file systems that provide a cheap storage mechanism and a flexible degree of parallelism for cloud-like elasticity made key-value stores a first class citizen in the data management arena. The plethora of systems is completed by triple stores to cope with schema-flexible data and graph-based organization. Since the schema comes with the data, the system provides efficient means to exploit explicitly modeled relationships between entities, run analytical graph algorithms, and exhibit a repository for weakly-typed entities in general.

Although specialized systems may be considered a smart move in a first performance-focused shot, the plethora of systems yields tremendous complexity to link different systems, run data replication and propagation jobs, or orchestrate query scenarios over multiple systems. Additionally, setting up and maintaining such an environment is not only complex and error prone but also comes with significantly higher total cost of ownership (TCO). From a high-level perspective, the following observation of motivations underlying the current situation can be made:

Usage perspective: SQL is no longer considered the only appropriate interaction model for modern business applications. Users are either completely shielded by an application layer or would like to directly interact with their database. In the first case, there is a need to optimally support an application layer with a tight coupling mechanism. In the second case, there is a need for scripting languages with built-in database features for specific application domains. There is also the need for a comprehensive support domain-specific and proprietary query languages, as well as a huge demand for mechanisms to enable the user to directly address parallelism from a programming perspective.

Cost awareness: There is a clear demand to provide a lower TCO solution for the complete data management stack ranging from hardware to setup costs to operational and maintenance costs by offering a consolidated solution for different types of workloads and usage patterns.

Performance: Performance is continually identified as the main reason to use specialized systems. The challenge is to provide a flexible solution with the ability to use specialized operators or data structures whenever possible and needed.

Different workload characteristics do not fully justify using the zoo of specialized systems. Our past experience of handling business applications leads us to support the hypothesis for a need of specialized collections of operators. There exists a bias against individual systems with separate life cycles and administration set-ups. However, providing a single closed system is too limiting, and instead a flexible data management platform with common service primitives is preferred.

Different workload characteristics—ranging from high volume transaction processing via support of read-mostly analytical DWH workloads to high-update scenarios of the stream processing domain do not fully justify going for the zoo of specialized systems. Experience with handling business applications leads to the need of specialized collections of operators.

In addition to pure data processing performance, the lack of an appropriate coupling mechanism between the application layer and the data management layer has been identified as one of the main deficits of state-of-the-art systems. Further, individual systems with separate life cycles and administration set-ups are more difficult to set up and manage, while a single closed system is usually too limiting. What is needed is a flexible data management platform with common service primitives on the one hand and individual query execution runtime environments on the other hand.

SUMMARY

This document describes an in-memory database platform, and describes details of some specific aspects of data management for coping with different transactional workloads.

In one aspect, a system and method includes providing a unified table architecture of an in-memory computing system. The unified table architecture includes a multi-level storage architecture, which has a first level storage structure to store incoming data requests in a logical row format as data records, a second level storage structure to encode and store the data records in a logical column format, and a main store to compress and store the encoded data records for long-term storage.

The system executes a method a method of query processing, the method includes receiving a query by a common query execution engine connected with the unified table architecture, the query specifying a data record. The method further includes performing, by the common query execution engine, a look-up for the data record based on the query at the first level storage structure. If the data record is not present at the first level storage structure, the method includes performing, by the common query execution engine, separate look-ups in each of the second level storage structure and the main store.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

Figure 1:
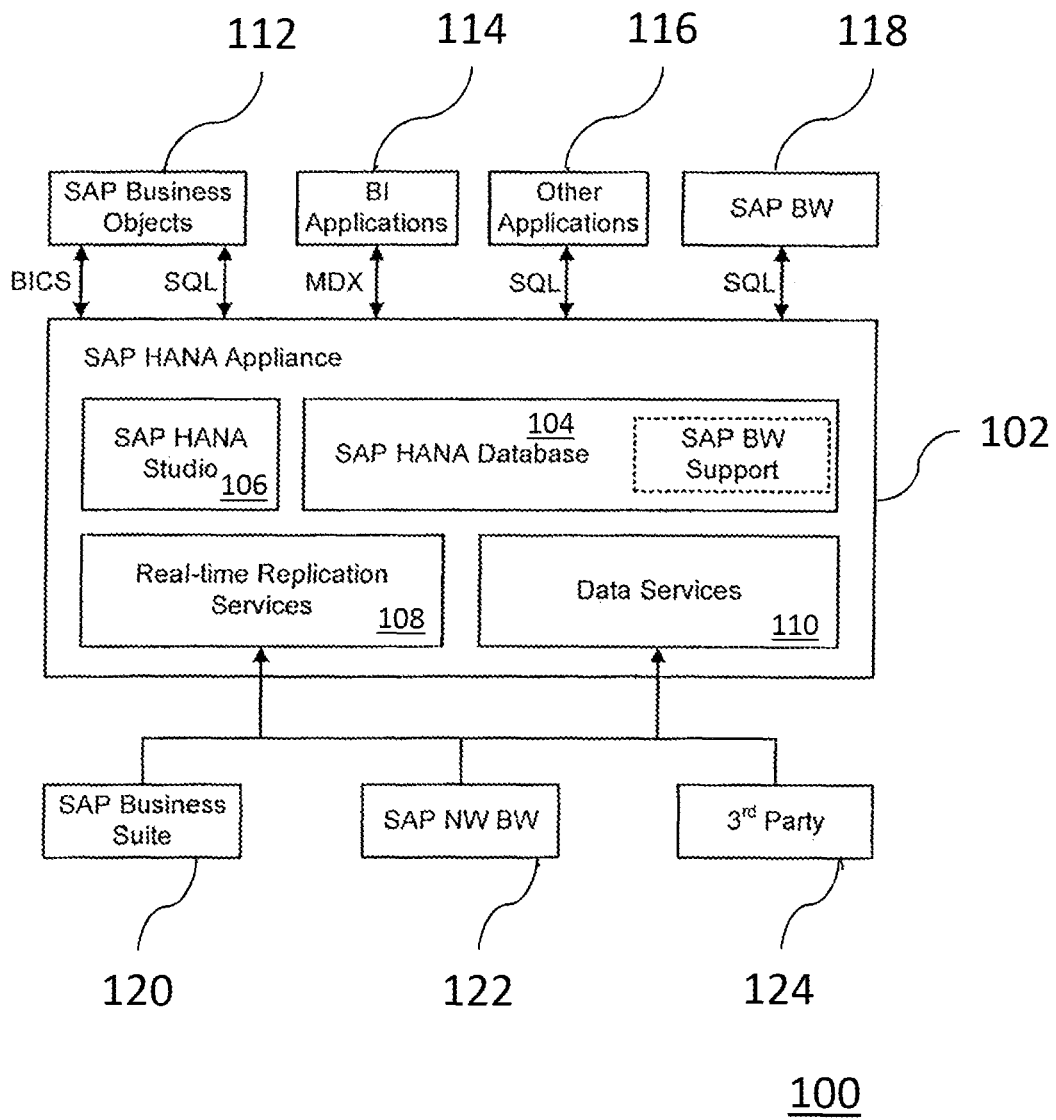
FIG. 1 is a diagram illustrating aspects of a system showing features consistent with implementations of the current subject matter.

FIG. 1 depicts a database system 100, having an in-memory database system (IMDS) 102, such as SAP's HANA database (which is sometimes used interchangeably hereafter as an example). The IMDS 102 includes an in-memory database 104 and a multi-engine query processing environment that offers different data abstractions supporting data of different degrees of structure, from well-structured relational data to irregularly structured data graphs to unstructured text data. This full spectrum of processing engines is based on a common table abstraction as the underlying physical data representation to allow for interoperability and the combination of data of different types. In exemplary implementations, the in-memory database system 102 further includes real-time replication services 108, and data services 110, which can each interface with business suite design environments 112, business warehouse design environments 122, and third party design environments 124.

The IMDS 102 supports the representation of application-specific business objects 112 (such as OLAP cubes and domain-specific function libraries) and logic directly inside the database engine. This permits the exchange of application semantics with the underlying data management platform that can be exploited to increase the query expressiveness and to reduce the number of individual application-to-database roundtrips and to reduce the amount of data transferred between database 104 and application 114, 116.

The IMDS 102 can efficiently communicate between the database and the application layer (i.e., proprietary applications 114, third party applications 116 and business warehouse applications 118) by providing shared memory communication with proprietary application servers on the one hand and directly support the data types natively in the data management layer on the other hand. In addition, application server technology is integrated directly into the database system cluster infrastructure to enable an interweaved execution of application logic and database management functionality.

The database system 100 also supports the efficient processing of both transactional and analytical workloads on the same physical database leveraging a highly-optimized column-oriented data representation. This is achieved through a sophisticated multistep record lifecycle management approach.

The IMDS 102 consists of an appliance model with different components to yield a ready-to-go package for data analytics scenarios. In some implementations, the IMDS 102 provides native support for a business warehouse (BW) system 112 to significantly speed up query and transformation scenarios but also allows to completely skip individual materialization steps. In order to provide this capability, the IMDS 102 has data loading and transformation tools, plus a modeling studio 106 to create and maintain complex data flows in and out of the IMDS 102. The database system 102 provides efficient and flexible data storage and data querying scenarios.

Figure 2:
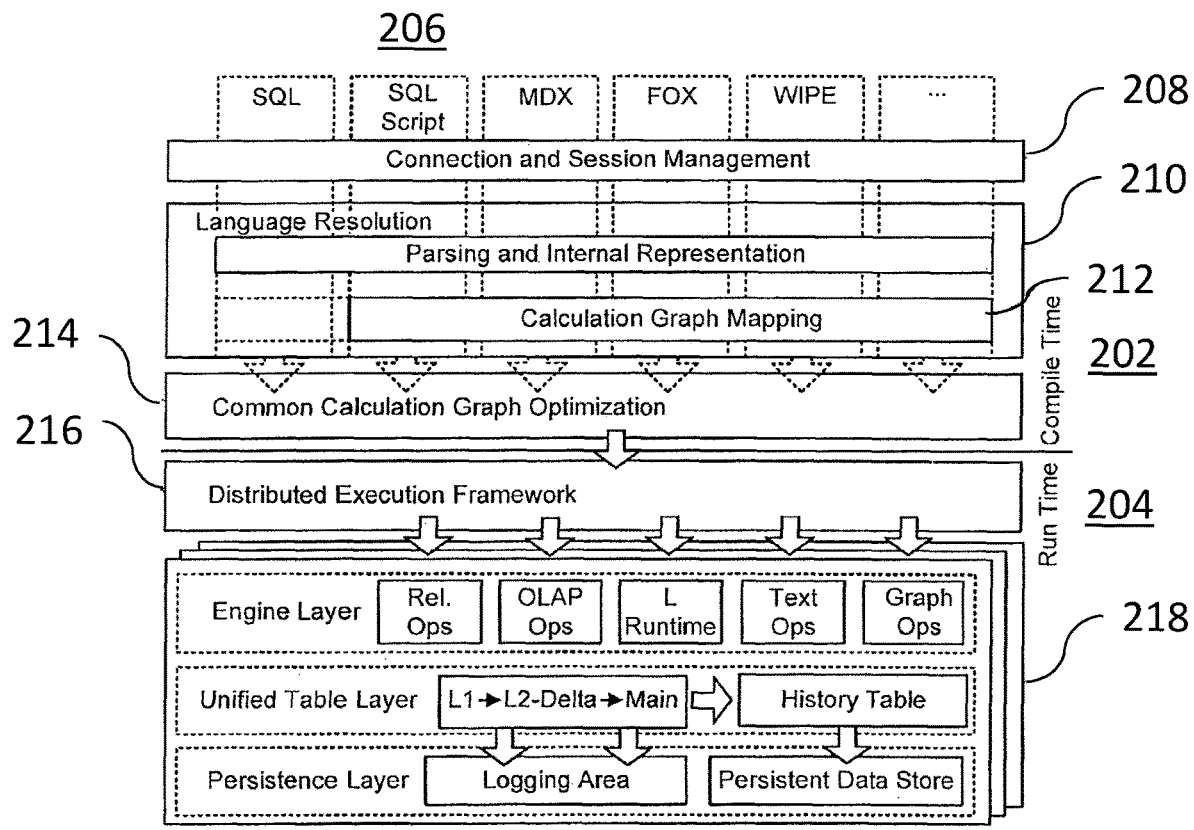
FIG. 2 illustrates database layered architecture for use with a system in accordance with implementations of the current subject matter.

The database system 102 follows a strict layered architecture as illustrated in FIG. 2. Similar to classical systems, the database system 102 distinguishes between compile time 202 and run time 202 of a database request. Also, although not shown in FIG. 2, other components such as a transaction manager, an authorization manager, a metadata manager etc. can complement the overall architecture.

As can be seen in FIG. 2, different query languages 206 can enter the system via a common connection and session management layer 208 performing all infrastructural tasks with the outside world (JDBC, ODBC connectors etc.). In a first step, a query string is translated by a language resolution engine 210 into an internal optimized representation (similar to an abstract syntax tree), which is local for every domain-specific language. In a second step, the query expression is mapped by a calculation graph mapping engine 212 to a calculation graph 214, which forms the heart of the logical query processing framework as part of a distributed execution framework 216 for an IMDS, which includes one or more customer-specific in-memory databases 218, the structure and operation of which are explained in further detail below.

Calculation Graph Model

A calculation graph model loosely follows the classical data flow graph principle. Source nodes are representing either persistent table structures or the outcome of other calculation graphs. Inner nodes reflect logical operators consuming either one or multiple incoming data flows and produce any arbitrary number of outgoing data flows. Moreover, the set of calculation graph operators can be split into two groups of operator types. On the one side, the calculation model defines a set of intrinsic operators, e.g. aggregation, projection, joins, union etc. SQL for example can be completely mapped to this class of operators. On the other side, the calculation model provides operators which implement core business algorithms like currency conversion or calendar functionality. Finally, the calculation model supports the following types of operators:

SQL nodes: A calculation model operator may execute a complete SQL statement on the incoming data flow. The statement can be a parameter and compiled and executed at runtime of the calculation graph, resulting in a form of "nested calculation" models.

Custom nodes: A custom node may be used to implement domain-specific operators in C++ for performance reasons. For example, the planning scenario with an SAP proprietary language such as FOX can exploit a special "disaggregate" operator to natively support financial planning situations. Other examples are optimized operations for graph traversal and analysis in data graphs via a proprietary WIPE graph language.

R nodes: An R node can be used to forward incoming data sets to an R execution environment. The R script, given as a parameter, will then be executed outside of the database system and results are moved back into the calculation graph for further processing.

L nodes: The language L represents the internal runtime language of the database system. L is designed as a safe subset of the C language and usually not directly accessible for end users or application designers. Instead, L is the target language for all constructs of domain-specific languages which cannot be directly mapped to data-flow graphs, i.e. all sorts of imperative control logic.

In addition to the set of functional operators, the calculation model provides "split" and "combine" operators to dynamically define and re-distribute partitions of data flows as a base construct to enable application-defined data parallelization. The individual compilers of the different domain-specific languages try to optimize the mapping from a given query script to a calculation graph. For SQL, the mapping is based on the well-defined logical representation of a query expression. In the general case, the mapping may be based either on heuristics or cost-based, depending on the estimated size of the input data etc. For example, the compiler may decide to unroll a loop into a regular data flow graph or generate L code for the specific expression. In the case of regular SQL, which is by far the largest and most complex part and taken from a main-memory row-oriented relational database system, such as SAP's P*Time1 system, the internal representation is directly mapped to a calculation graph exhibiting only operators with pre-defined semantics to capture the intent of the SQL statement.

Figure 3:
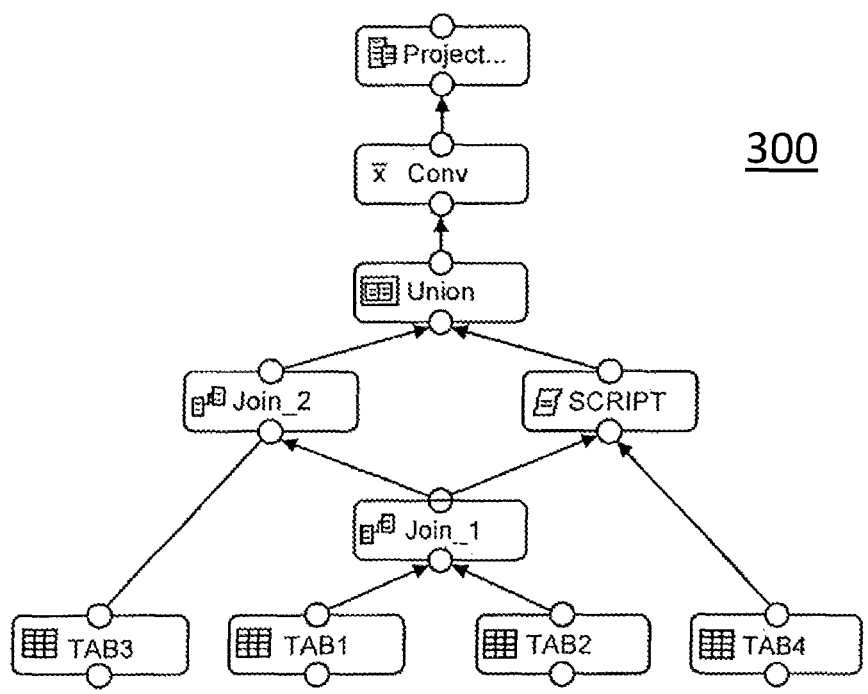
FIG. 3 illustrates a calculation model graph.

A sample calculation model graph 300 is depicted in FIG. 3. Calculation models are either created indirectly via the compiler of a individual domain-specific language, or can be visually modeled in the database Studio and registered as calculation views in the meta data repository of the database system. The overall idea behind this process is to customize specific fragments of a complex business logic scenario, which can be fine-tuned and re-used in multiple database scenarios, independent of the actual query language, i.e. calculation models can be consumed from any domain-specific language stack in the form of a virtual table. The collection of calculation models is also referred to as database system content, and undergoes a separate product life cycle process. The calculation model graph 300 shown in FIG. 3 outlines some of the differences with respect to regular query plans in relational database systems. For example, the result of an operator may have multiple consumers to optimize for shared common subexpressions already from an application point of view. Secondly, a node labeled "script" wraps imperative language snippets coming either from a calculation model designer, or are system generated by a domain-specific query compiler. Additionally, a node "conv" shows the use of a built-in business function to perform application-specific conversion routines, e.g. currency conversion or unit conversion.

Calculation Graph Compilation and Execution

Once the user-defined query expressions or query scripts are mapped to a data flow graph in the calculation model, an optimizer runs classical rule and cost-based optimization procedures to restructure and transform the logical plan into a physical plan which can then be executed by a distributed execution framework.

The execution framework orchestrates the actual data flow and the distributed execution of physical operators. During optimization, the fragments of the logical data-flow graph are mapped to physical operators provided by the "Engine Layer". The Engine layer itself consists of a collection of different physical operators with some local optimization logic to adapt the fragment of the global plan to the specifics of the actual physical operator. In particular, the database system provides the following set of operators:

Relational Operators: The collection of relational operators handles classic relational query graph processing. As described in more detail, relational operators show different characteristics, e.g. some of the operators like equi-join directly leverage existing dictionaries of the unified table.

OLAP operators: OLAP operators are optimized for star-join scenarios with fact and dimension tables. Once the optimizer recognizes this type of scenarios, mapping of the corresponding query plan fragment to OLAP operators is enumerated as a feasible physical plan with corresponding cost estimation.

L runtime: The runtime for the internal language L reflects the building block to execute L code represented in the L nodes of a given calculation graph. Using the "split and combine" operator pair, the L runtime can be invoked in parallel working on the pre-defined partitions.

Text operators: The set of text search analysis operators comprises the set of functionality already available in some products, such as the SAP Enterprise Search product, to deliver comprehensive text analysis features ranging from similarity measures to entity resolution capabilities.

Graph operators: Graph operators provide support for graph-based algorithms to efficiently implement complex resource planning scenarios or social network analysis tasks.

Since a data flow graph is distributed not only between multiple server instances (usually running on different physical nodes) but also between different types of operators, the system provides a set of tools for an optimal data transfer and exchange format. Although all operators are required to implement a standard data transfer protocol, individual operators within or beyond different "collections" may have a highly specialized communication protocol. For example, the relational and OLAP operators are exchanging data in a highly compressed and proprietary format. Also, the R node provides a mapping to the R internal data frame format.

In addition to the "horizontal" communication between different physical operators, they also exploit a common interface to the unified table layer. As outlined in more detail in the following section, the database system provides an abstract tabular view with a variety of access methods for the different operators. The common tabular structure implements a complete life cycle of a data entity and basically consists of a combination of row- and column-store to capture the effects of the most recent modification operations. Since a table in the database system can be marked as "historic", the table layer also provides the implementation of a history table capturing the past values of an active entity and provides access methods for time travel queries.

In some implementations, the database system relies on a persistence layer to provide recoverability in case of loss of the database state captured in main memory. The persistence layer is based on a virtual file concept with pages of variable size. The persistence layer relies on frequent save pointing to provide a consistent snapshot with very low resource overhead. These features are described in further detail below.

In contrast to classical systems, a database system, in accordance with implementations consistent with this description, is a flexible platform to support multiple (proprietary) domain-specific languages. A flexible data flow model (calculation graph model) provides the conceptual core of the system: On the one side, query expressions or query scripts are mapped to an instance of the model. On the other side, all different physical operators are using the same table layer interface implementing a complete life cycle management for individual records. Logging and data area are used to maintain a transactionally consistent copy of the main memory database in persistent storage.

Figure 4:
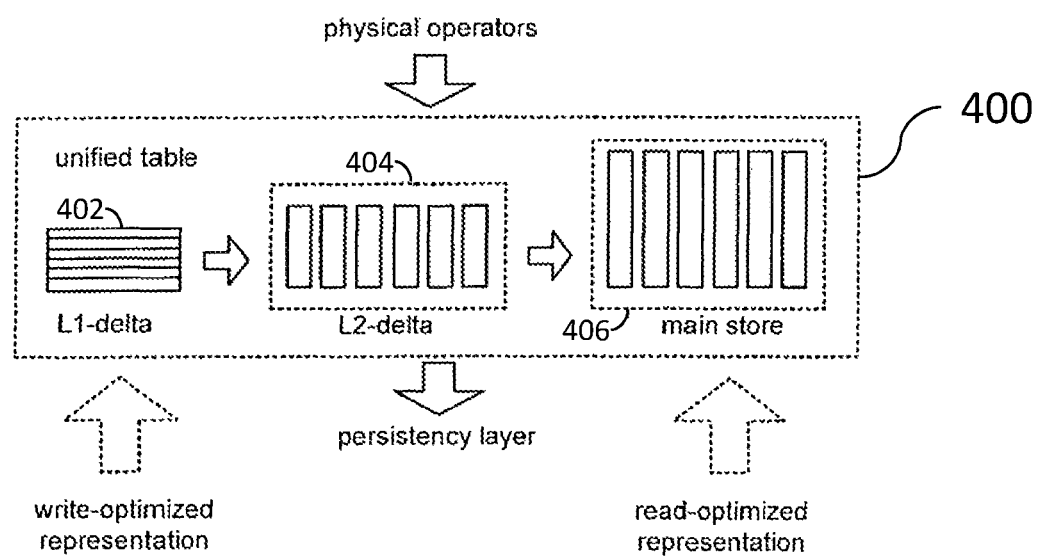
FIG. 4 illustrates a unified table storage architecture.

As shown in FIG. 4, a unified table structure 400 provides data access for all applicable physical operators. The unified table structure 400 provides life cycle management for an individual database record. The technique of the unified table is not only the key to provide excellent performance for both scan-based aggregation queries but also for highly selective point queries. This provides a key differentiator to conventional row-based database architectures. While a record conceptually remains at the same location throughout its lifetime in update-in-place-style database systems, the unified table structure 400 propagates records through different stages of a physical representation. Although designed as a general concept, the most usual setup consists of three stages for records within a regular table, as described below.

As shown in FIG. 4, the unified table structure 400 includes an L1-delta structure 402. The L1-delta structure 402, also called "hotdelta" (or L1-delta for short), accepts all incoming data requests and stores them in a write-optimized manner, i.e. the L1-delta structure 402 preserves the logical row format of the record, and is optimized for fast insert and delete, field update, and record projection. Moreover, the L1-delta structure 402 can perform data compression. As a rule of thumb, the L1-delta structure 402 may hold 10,000 to 100,000 rows per single table depending on the workload characteristics and the amount of available memory.

The unified table structure 400 further includes an L2-delta structure 404. The L2-delta structure 404, also called "colddelta" (or L2-delta, for short), represents the second stage of the record life cycle and is organized in the column store format. In contrast to the L1-delta structure 402, the L2-delta structure 404 employs dictionary encoding to achieve better memory usage. However, for performance reasons, the dictionary is unsorted requiring secondary index structures to optimally support point query access patterns, e.g. fast execution of unique constraint checks. The L2-delta structure 404 is well suited to store up to 10 millions of rows or more.

The unified table structure 400 further includes a main store 406. The main store 406 represents the core data format with the highest compression rate, and exploiting a variety of different compression schemes. By default, all values within a column are represented via the position in a sorted dictionary and stored in a bit-packed manner to have a tight packing of the individual values. While the dictionary is always compressed using a variety of prefix-coding schemes, a combination of different compression techniques—ranging from simple run-length coding schemes to more complex compression techniques—are applied to further reduce the main store memory footprint.

Database system employing the unified table structure 400 are designed for OLAP-heavy use-cases with complex and high-volume loading scenarios, and the system provides a special treatment for efficient bulk insertions, which may directly go into the L2-delta, bypassing the L1-delta. Independent of the place of entry, the RowId for any incoming record will be generated when entering the system. Also, logging happens at the first appearance of a row, be it within the L1-delta for regular update/insert/delete operations or for the L2-delta in case of bulk load operations.

Unified Table Access

The different data structures share a set of common data types. The access is exposed through a common abstract interface with row and column iterator, both optionally dictionary-based.

Moreover, some of the physical operators may pull record-by-record or in a vectorized way (i.e. block-by-block) following a conventional ONC-protocol to enable pipelined operation and reduce the memory requirements for intermediate results as much as possible. Other physical operators implement the "materialize all"-strategy to avoid operator switching costs during query execution. The optimizer decides on a mixture of the different types of operators depending on the logical calculation model, i.e. the different types of operators are seamlessly integrated within a final query execution plan.

For the operators leveraging sorted dictionaries, the unified table access interface also exposes the table content via a global sorted dictionary. Dictionaries of two delta structures are computed (only for L1-delta) and sorted (for both L1-delta and L2-delta) and merged with the main dictionary on the fly. In order to implement efficient validations of uniqueness constraints, the unified table provides inverted indexes for the delta and main structures.

The record life cycle is organized in a way to asynchronously propagate individual records through the system without interfering with currently running database operations within their transactional sphere of control. The current database system provides two transformations, called "merge steps":

L1-to-L2-delta Merge: The transformation from L1-delta to L2-delta implies a pivoting step from row to column organization. Rows of the L1-delta are split into their corresponding columnar values and column-by-column inserted into the L2-delta structure. At the receiving side, the system performs a lookup to identify potentially missing values in the dictionary structure and optionally inserts new entries at the end of the dictionary to avoid any major restructuring operations within the dictionary. In the second step, the corresponding column values are added to the value vector using the dictionary encodings (append-only structure). Both steps can be performed in parallel, because the number of tuples to be moved is known in advance enabling the reservation of encodings in the new dictionary before actually inserting them. In a third step, the propagated entries are removed from the L1-delta. All running operations either see the full L1-delta and the old end-of-delta border or the truncated version of the L1-delta structure with the expanded version of the L2-delta. By design, the transition from L1-delta to L2-delta is incremental in nature, i.e. the transition of records does not have any impact in terms of reorganizing the data of the target structure.

L2-delta-to-main Merge: A new main structure is created out of the L2-delta and the existing main. While the L1-to-L2-delta Merge is minimally invasive with respect to running transactions, a L2-delta-to-main merge is a resource-intensive task which has to be carefully scheduled and highly optimized on a physical level. As soon as a L2-delta-to-main merge is started, the current L2-delta is closed for updates and a new empty L2-delta structure is created serving as the new target for the L1-to-L2-delta merge. If a merge fails, the system still operates with the new L2-delta and retries the merge with the previous versions of L2-delta and main. The core algorithms are described in further detail below, as well as more details of different optimization techniques such as column-wise or partial merge.

Both merge operations described above do not affect contained data in the table, but the table is reorganized. However, the merge operations are independent of restart or backup log replay.

Persistency Mapping

Figure 5:
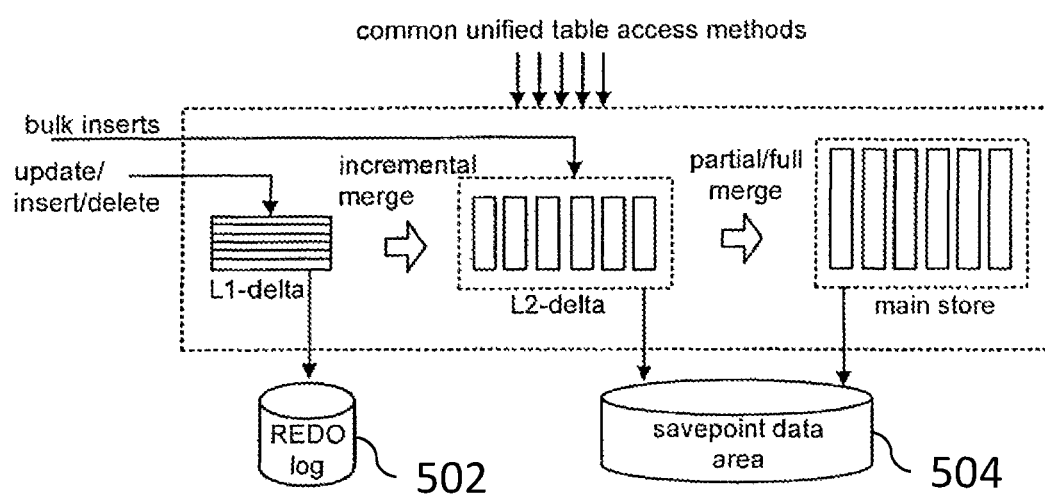
FIG. 5 is an overview of persistency and savepoint mechanisms of a unified table.

Although the database system is a main-memory centric database system, its full ACID support guarantees durability as well as atomicity and recovery in case of a system restart after regular shutdown or system failure. Persistency of the database system can be based on multiple persistency concepts. As can be seen in FIG. 5, a persistency 500 is based on a combination of temporary REDO logs 502 and save pointing in a save point data area 504 for short-term recovery or long-term backup.

Logging for the REDO purpose is performed only once when new data is entering the system, either within the L1-delta or for bulk inserts within the L2-delta. New versions of a record are logged when entering the L1-delta. Changes which occur during the incremental propagation from the L1- to the L2-delta are not subject of REDO logging. Instead, changes in the dictionary as well as in the value index are added to the data structures residing in individual data pages, which are eventually moved to persistent storage within the next savepoint. Older version of the main and longer delta can be used at restart time in case the merge has not yet been persisted via savepoint. Since a merge is a reorganization, the contents of the table are still the same to ensure a consistent database start after restart.

Figure 6:
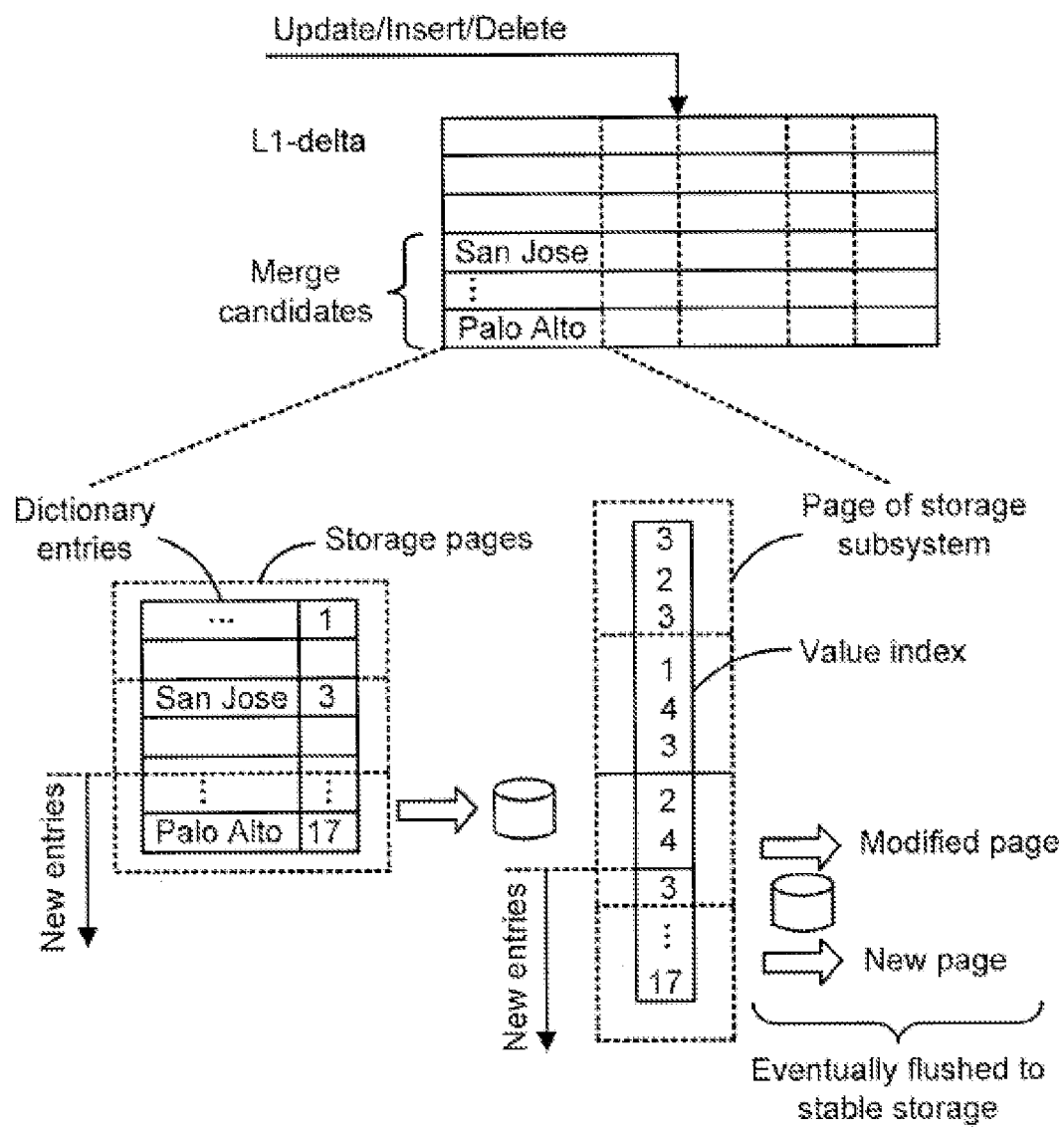
FIG. 6 illustrates a delta merge process using a unified table.

FIG. 6 illustrates operations of persistency mapping. Both the dictionary and the value index are based on a paged storage layout managed by the underlying storage subsystem. Dirty pages—either existing pages with additional entries or new pages—are flushed out by the storage subsystem under the control of the save pointing infrastructure. Although the L2-delta structure is organized per column, the system may store fragments of multiple L2-delta columns within a single page in order to optimize for memory consumption. Especially for small but wide tables, storing multiple L2-delta columns within the same page can be very reasonable. After the savepoint, the REDO log can be truncated. During recovery, the system reloads the last snapshot (savepoint) of the L2-delta and applies REDO log entries written since the relevant savepoint.

Similarly, a new version of the main will be persisted on stable storage and can be used to reload the main store of a unified table. In summary, neither truncation of the L2-delta nor changes of the main are recorded in a log because the image of the previous version still exists. Classical logging schemes are only employed for the L1-delta and for bulk load into L2-delta.

In summary, the physical representation of a table within the database system consists of three levels—a row store (L1-delta) to efficiently capture incoming inserts as well as update and delete requests, an intermediate structure in column format (L2-delta) to decouple the write-optimized from a read-optimized store, the main store structure. This third structure is extremely well suited for OLAP-like queries, but is also well tuned to answer point queries efficiently by using inverted index structures. During the lifetime, a record will be asynchronously propagated through the storage structures to land in the most update efficient store at the beginning and stay in the most read-efficient store for the rest of its lifetime.

Merge Optimization

A main idea of the unified table approach described above is to provide a transparent record propagation from a write-optimized storage structure to read-optimized storage structures with the L2-delta index to de-couple both extremes. While the transition from the L1-delta to the L2-delta can be conducted without major disruption of the existing data structures, the merge of L2-delta and main requires a major reorganization of the table's content.

Classic Merge

In a first step of a classic merge operation, the dictionary entries of the L2-delta are compiled into the dictionary of the main lexicographically to yield a sorted new main dictionary for the specific column. The new dictionary contains only valid entries of the new main structure, discarding entries of all deleted or modified records. The sort order of the dictionary not only provides the prerequisite for optimal compression but also is the base for special operators working directly on dictionary encoded columns.

Figure 7:
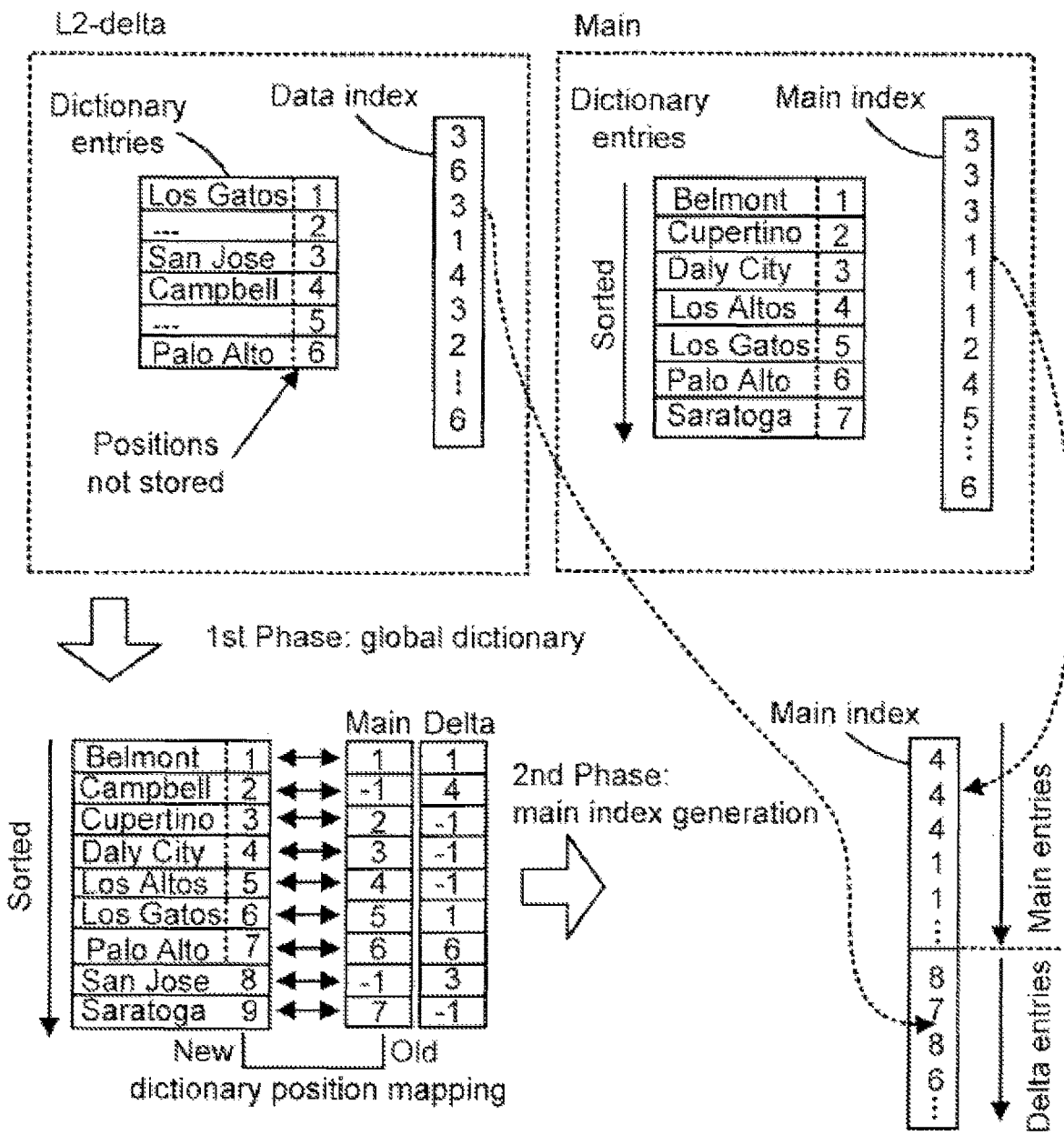
FIG. 7 illustrates another merge operation using a unified table.

FIG. 7 shows the principal phases of a merge step. Based on the L2-delta with an unsorted dictionary and the old main with a sorted dictionary, the first phase generates the new sorted dictionary and preserves the mapping information from the new positions (which are obviously not explicitly stored) and the old positions within the main and L2-delta. As can be seen in the FIG. 7, some entries show positions in both dictionaries (e.g. "Los Gatos") or they only appear in the main or L2-delta dictionary (e.g. "Campbell" with value 4 in the delta and a value of −1 at the main side of the dictionary position mapping table). In a second phase, the new main index is constructed with the positions referring to the new dictionary for existing and newly added entries. For example, referring again to FIG. 7, the entries for "Daily City" are transferred to the new main with the new position value 4. Entries for "Los Gatos" are also mapped to the new position (now 6) from position 1 in the L2-delta and position 5 in the old main structure. The new main (dictionary and value index) is written to disk and the old data structures are released. In any case the system has to keep the old and the new versions of a column (dictionary and main index) in main memory until all database operations of open transaction still referring to the old version have finished their execution.

Since the basic version of the merge is very resource-intensive, the database system implements a number of different optimizations. For example, if the dictionary of the L2-delta is a subset of the main dictionary, the first phase of a dictionary generation is skipped resulting in stable positions of the main entries. Another special case exists if the values of the L2-delta dictionary are greater than the values in the main dictionary, e.g. in the presence of increasing timestamps. In this situation, the dictionary of the L2-delta can be directly added to the main dictionary, if the number of bits to encode the dictionary values is sufficient to cope with the extended cardinality. More complex optimizations can be seen in the orthogonal techniques of re-sorting merge and partial merge strategies. Both techniques are outlined in more detail below.

Re-Sorting Merge

The classic version of a merge between the L2-delta and the main requires a mapping of the previous positions of the dictionary entries to the new positions of the new dictionary. The positions then encode the real values within the bit-packed value index, i.e. with C as the number of distinct values of the column, the system spends $\lceil \log_2(C) \rceil$—many bits to encode the positions. The merge maps the old main values to new dictionary positions (with the same or an increased number of bits) and adds the entries of the L2-delta at the end of the new value index.

An extended version of the merge aims at reorganizing the content of the full table to yield a data layout which provides higher compression potential with respect to the data distribution of all columns. Since the database system column store exploits a positional addressing scheme, the values of the k-th record have to be at the k-th position in every column. Re-sorting one column to gain an optimal compression scheme therefore directly affects the compression potential of all other columns within the table. The system computes the "best" sort order of the columns based on statistics from main and L2-delta structures before creating the new main.

Figure 8:
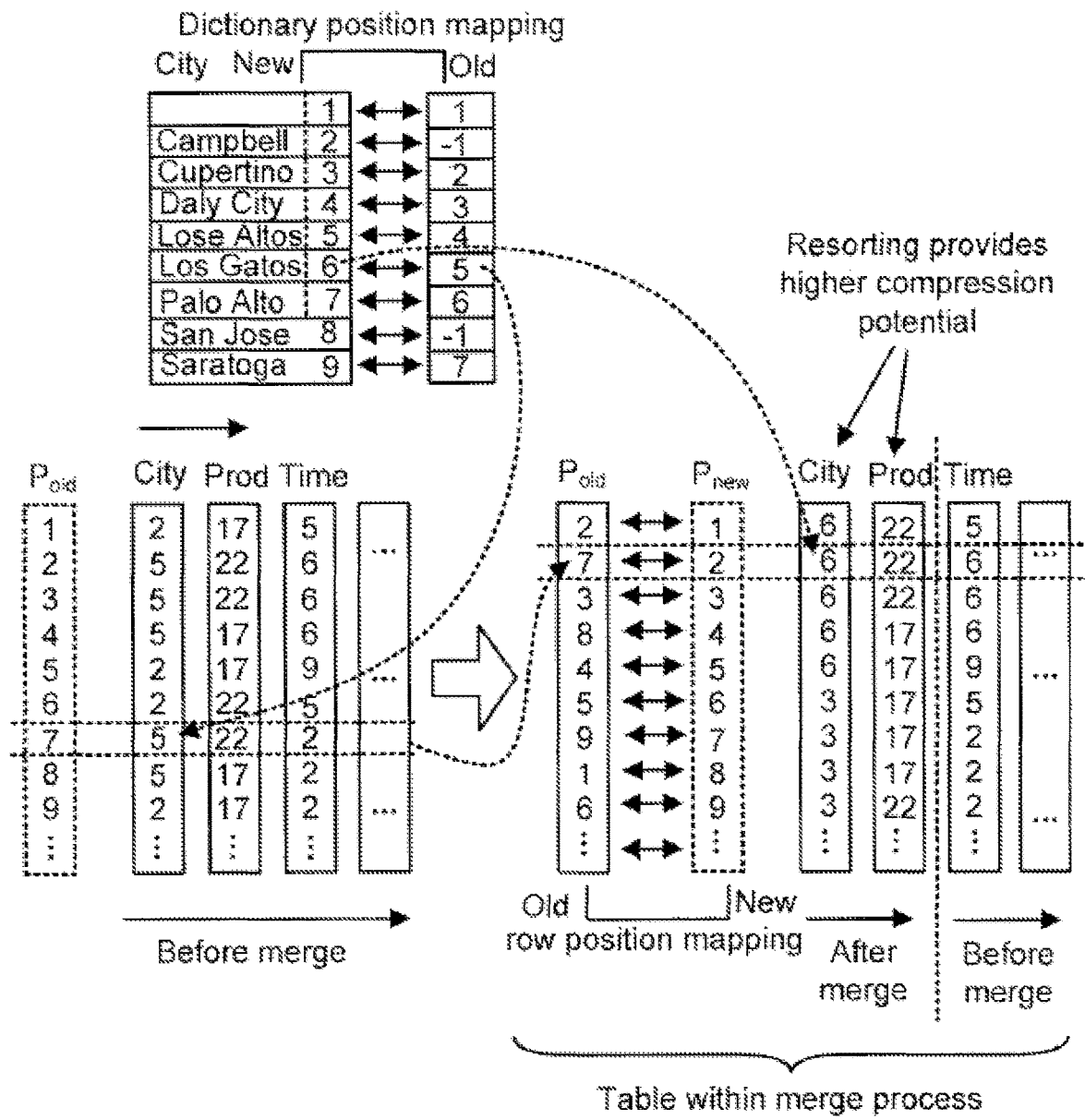
FIG. 8 illustrates a merge with reordering.
Figure 9:
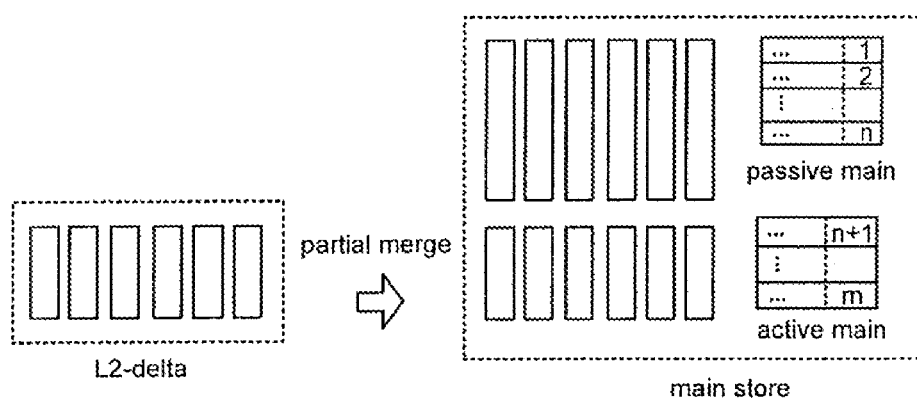
FIG. 9 illustrates a partial merge operation.

FIG. 8 shows the necessary data structures. In addition to the mapping table for the dictionary to translate old dictionary positions to the positions in the new dictionary, the version of the re-sorting merge additionally creates a mapping table of the row positions to be able to reconstruct the row after merging and re-sorting individual columns. FIG. 8 shows columns of the same table before and within a merge process where columns "City" and "Prod" are already merged, the remaining columns (e.g. "Time" etc.) still reflect the status before the merge. Therefore, the entries of the old version of the main correspond to positions in the old dictionary, e.g. the entry "Los Gatos" of the "City" column is encoded with value 5 in the old dictionary and 6 in the version after the merge. Thus in general, after applying the merge to the "City" column, the new main index shows the dictionary positions of the new dictionary as well as a re-sorting of the rows.

As illustrated, the 7th row can now be found at the second position. The "Prod"-column was also merged without building a new dictionary, e.g. the dictionary positional values are preserved. The "Time"-column however was not yet merged and still refers to the old dictionary and the old sort order. Any access to not yet merged columns is required to take an additional indirection step via the row position mapping table if a row construction with already merged columns is required. The row position mapping table can be eliminated after the merge of all columns has been completed. Although the system may conceptually delay the merge of infrequently accessed columns by "stacking" row position mapping tables, the system always completely finishes a merge operation for the full table before starting a new merge generation. Applying a re-sorting merge is therefore a cost-based decision to balance the overhead of the additional position mapping for column accesses during the merge for all columns and the resulting potential for a higher compression rate. The sort criterion for applying the merge to the individual columns also depends on multiple factors, e.g. ratio of point versus range access, improvement in compression potential etc.

Partial Merge

The major drawback of the classic or the re-sort merge consists in the overall overhead to create a new version of the main. For large tables or partitions, computing a new dictionary and re-generating the main index does have a negative impact on available CPU and disk resources. The partial merge tries to soften this problem by generalizing the previous algorithms. The partial merge strategy shows the best potential for saturated columns, i.e. in situations when the number of new entries in the dictionary is small.

The partial merge is configured to split the main into two (or even more) independent main structures:
  Passive main: The passive main reflects a stable part of the main store which is in general not part of the merge process.
  Active main: The active main is the part of the column which grows/shrinks dynamically and takes part of the merge process with the L2-delta.

In some implementations, a merge interval within the partial merge strategy starts with an empty active main. The passive main reflects the regular main structure with a sorted dictionary and a corresponding values index. Whenever a merge operation is scheduled, the L2-delta merges with the (still empty) active main; the passive main remains untouched. Compared to the full merge, the partial merge shows one small exception. The dictionary of the active main starts with a dictionary position value of n+1 where n as the cardinality of the passive main dictionary. Although the system now has two main structures with locally sorted dictionaries, the encodings of the individual main value index structures are not overlapping. The dictionary of the active main only holds new values not yet present in the passive main's dictionary.

Figure 10:
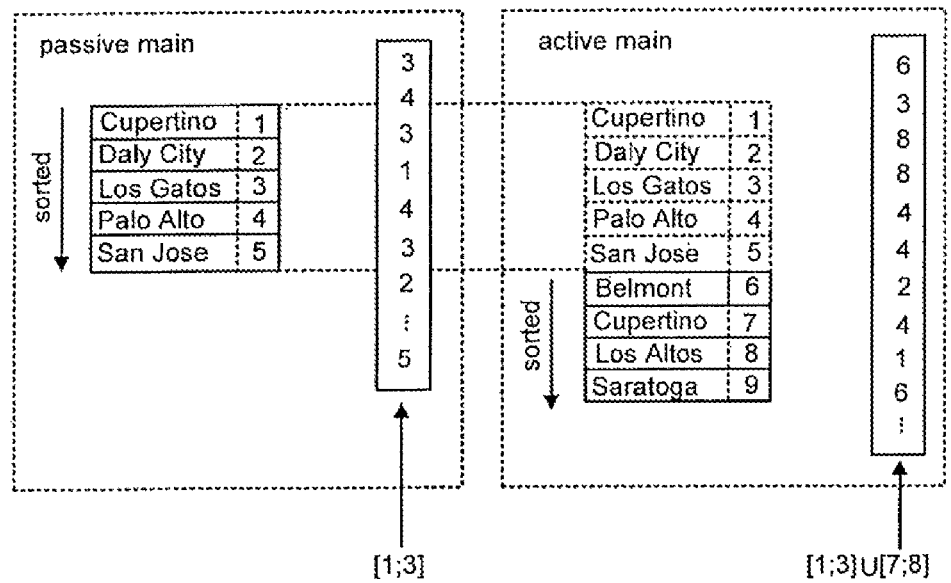
FIG. 10 illustrates a range query execution for active and passive main memory of a unified table.

FIG. 10 shows a sample situation with a passive and an active main after a partial merge. The dictionary codes of the active main start with the encoding value n+1=6, such that it continues the encoding scheme of the passive main. While the corresponding value index structure of the passive main only holds references to entries in the passive main dictionary, the value index of the active main also may exhibit encoding values of the passive main making the active main dictionary dependent on the passive main dictionary.

A point access is resolved within the passive dictionary. If the requested value was found, the corresponding position is used as the encoding value for both, the passive and the active main value index. Parallel scans are executed to find the corresponding entries. However, if the requested value was not found, the dictionary of the active main is consulted. If the value is present, only the active main value index is scanned to identify the resulting row positions. For a range access, the ranges are resolved in both dictionaries and the range scan is performed on both structures. For the active main, the scan is broken into two partial ranges, one for the encoded range value of the passive dictionary and one for the encoded range value of the active main dictionary. FIG. 10 illustrates this behavior for a range query with values between C % and L %. In order to guarantee transaction consistency, the query processing additionally requires similar merges with the L1- and L2-delta.

While the system is operating, the active main may dynamically shrink and grow until a full merge is scheduled. The major advantage of the concept is to delay a full merge to situations with low processing load and reduce the cost of the L2-to-(active-)main merge. Also, the optimization strategy may be deployed as a classical merge scheme by setting the maximal size of the active main to 0 forcing a (classical) full merge in every step. The procedure can be extended to multiple passive main structures forming a logical chain with respect to the dependencies of the local dictionaries. This configuration is suitable for columns with slowly changing or stable dictionaries (e.g. "Country" column in a "Customer"-table). However, for most of the columns, the system will hold only one passive main.

The partial merge optimization strategy implements an additional step in the general record life cycle of the database system unified table concept. The closer to the end of the pipeline, the more complex and time- and resource consuming re-organizations are applied to the records to finally end in the highly compressed and read optimized format of the traditional column store. In addition, the database system provides the concept of historic tables to transparently move previous versions of a record into a separate table construct. However, a table has to be defined of type "historic" during creation time. Furthermore, the partitioning functionality can be used to separate recent data sets from more stable data sets from an application point of view.

Figure 11:
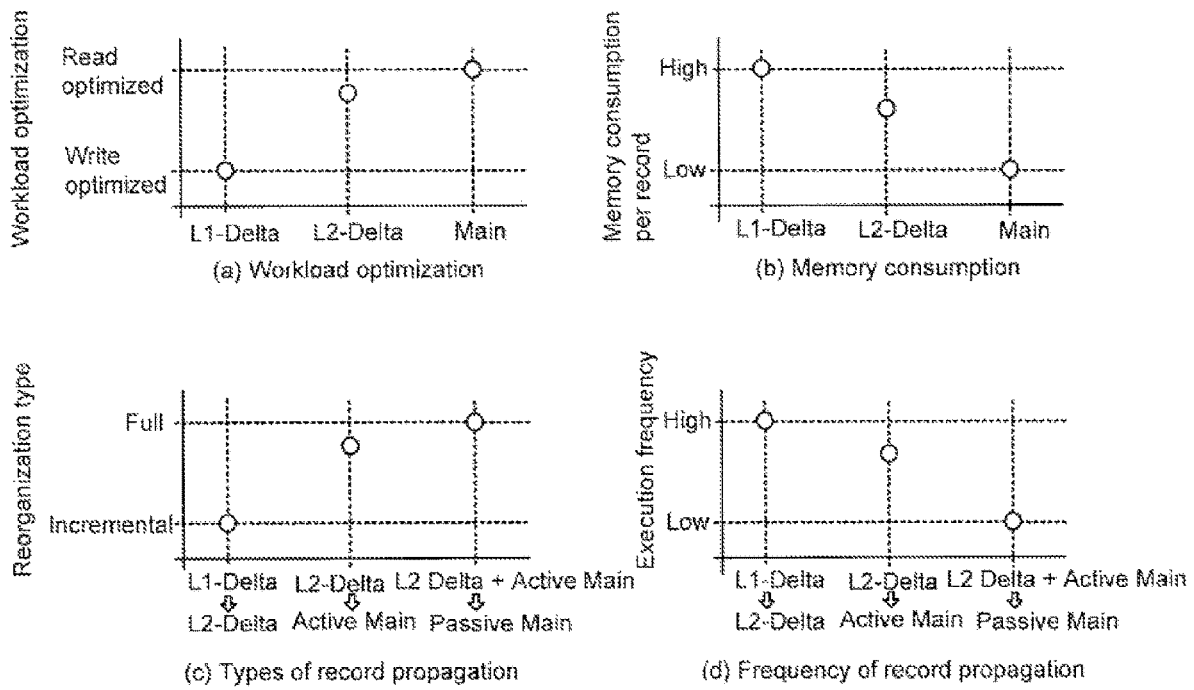
FIG. 11 illustrates a database record life cycle in accordance with implementations of the current subject matter.

As described above, the database system exploits the idea of a record life cycle management to provide efficient access for transactional and analytical workloads. FIG. 11 highlights the different characteristics of the discussed storage formats and propagation steps. The L1-delta is optimized for update-intensive workloads and can be incrementally and frequently merged into the L2-delta structure. The L2-delta structure is already well-tuned for read operations but requires a larger memory footprint compared to the highly read-optimized main structure. However, L2-delta serves particularly well as a target of the L1-delta rows or bulk insertions. As previously discussed, the main, optionally split into an active and passive part, exhibits the highest compression rate and is optimized for scan-based query patterns. Due to the resource-intensive re-organization tasks, merges into the active main and especially full merges to create a new main structure are scheduled with a very low frequency. The merge of L1- to L2-delta, in contrast, can be performed incrementally by appending data to the L2-delta dictionary and value index.

Figure 12:
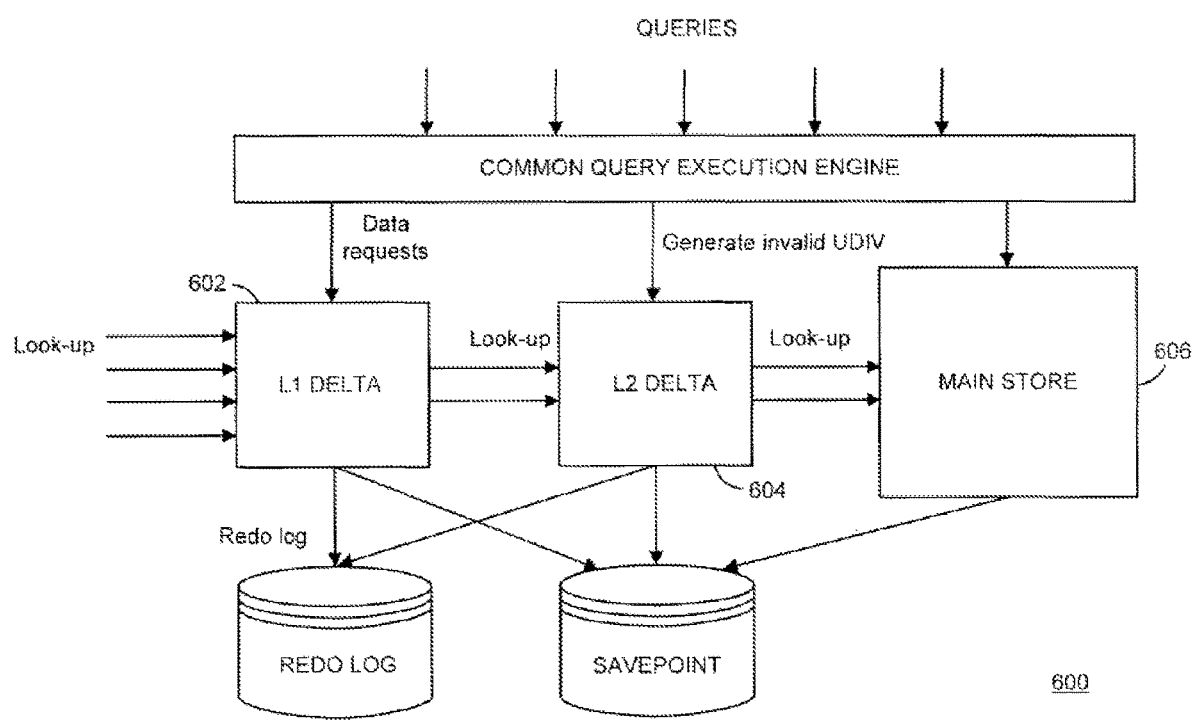
FIG. 12 illustrates a delete operation for data in L2 memory or main memory.

FIG. 12 illustrates operations 600 for data in L2-delta memory 604 or in main memory 606 of a unified table architecture of an in-memory computing system. As discussed above, the unified table architecture has a multi-level storage architecture including a first level storage 602 (L1-delta storage) structure to store incoming data requests from a common query execution engine 601 in a logical row format as data records. The unified table architecture further includes a second level storage 604 (L2-delta storage) structure to encode and store the data records in a logical column format, and a main store 606 to compress and store the encoded data records for long-term storage.

A data record is defined by a row ID. A delete operation of the data record includes performing a look-up for the data record in the table using its row ID. The lookup is first performed in L1 delta. If the document identifier is not found in the L1 delta storage, a look-up is performed in the L2 delta storage. If it is not found in L2 delta, the lookup is performed in the main store. When the location of the row has been determined, the respective visibility information for L1 delta, L2 delta or main storage is modified in a way to mark the row as deleted. Various parts of the table may use different visibility information structures, such as a bitmap of visible rows and set of transaction-specific delta bitmaps or deletion timestamps per record. After the visibility information is modified appropriately, REDO log entry is written into REDO log of the database and UNDO log entry is written into UNDO log of the transaction. In case the transaction commits, its UNDO entries are discarded and data space of the deleted row is reclaimed during merge operation, when there is no consistent view potentially reading the deleted row. In case the transaction aborts, UNDO operation is executed to roll back the change to the visibility information.

The update of the data record can be realized by combining of insert of a new version of the record and deletion of the current version of the record. This is the case when the record is already located in L2 delta or main store. In the case when the record is located in L1 delta store, the record can be updated in-place by first materializing it in an extra version space and then consolidating the versions from version space back to L1 delta store. Aside from being uncompressed, this is one of the primary advantages of L1-delta. Since the update is done in-place, there is no need to update secondary indices for non-key updates.

In this case, the row ID of the record may or may not change through the update operation. Updates in L2 delta and main always generate new RowID for the updated record. The new version is placed into L1 delta. Again, REDO log entry is written to the REDO log of the database and UNDO log entry is written into UNDO log of the transaction. In this case, the rollback of the transaction (executing the UNDO operation) will either just mark the visibility information of the new and old row version appropriately (update in L2 delta or main), or it will remove the new version from version space (update of L1 delta).

FIG. 12 illustrates unified table query processing on a multi-level storage architecture. Queries are received by a common query execution engine, which processes the each query and performs look-ups based on the query on L1-delta data 602, L-2 delta data 604 and main data 606. The queries can be processed and parsed for any type of application, for which the multi-level storage is suitable. In one implementation, for a first query type, the common query execution engine performs a look up only on L1-delta 602 first. If the requested data is not present at the L-1 delta data 602, the common query execution engine performs a look-up in both the L2-delta data 604 and the main data 606, separately, of the multi-level storage architecture.

In some implementations, for a second query type, the common query execution engine performs a look up on L1-delta data 602 first, and then at both L2-delta data 604 and main data 606 simultaneously in parallel. The common query execution engine can then union the intermediate results of the query. If the second query type is unsuccessful, the common query execution engine can trigger an on-demand mini-merge or an on-demand dictionary creation for L1-delta 602.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method comprising:
receiving a query for data stored in a database, wherein the database stores the data in accordance with a multi-level storage structure that includes a first level storage structure, a second level storage structure, and a main store, wherein the first level storage structure is configured to store at least a first data in a write-optimized logical row store, wherein the second level storage structure is configured to store at least a second data in a column store, and wherein the main store is configured to store at least a third data in a corresponding column store; and
in order to respond to the query, performing a look-up for the data in the multi-level storage structure, the look-up performed first at the first level storage structure, and if the data is not found at the first level storage structure, the look-up for the data is performed at the second level storage structure, and if the data is not found at the second level storage structure, the look-up for the data is performed at the main store.

2. The method in accordance with claim 1, wherein at least one of the look-up is based at least in part on a sorted dictionary.

3. The method in accordance with claim 1, wherein the look-up of the first level storage structure is based on an unsorted dictionary.

4. The method in accordance with claim 1, wherein the look-up of the second level storage structure is based on a sorted dictionary and an index.

5. The method of claim 1, further comprising merging, into a main dictionary that is sorted, a first dictionary for the first level storage structure and a second dictionary of the second level storage structure.

6. The method in accordance with claim 1 further comprising storing a new version of the data, when the first level storage structure receives a request comprising an update operation, an insert operation, or a delete operation.

7. The method in accordance with claim 6, further comprising storing the new version of the data, when the second level storage structure receives a bulk insert.

8. The method of claim 1, wherein the database comprises an in-memory database.

9. A system comprising:
at least one programmable processor;
at least one memory including program code which when executed causes operations comprising:
receiving query for data stored in a database, wherein the database stores the data in accordance with a multi-level storage structure that includes a first level storage structure, a second level storage structure, and a main store, wherein the first level storage structure is configured to store at least a first data in a write-optimized logical row store, wherein the second level storage structure is configured to store at least a second data in a column store, and wherein the main store is configured to store at least a third data in a corresponding column store; and
in order to respond to the query, performing a look-up for the data in the multi-level storage structure, the look-up performed first at the first level storage structure, and if the data is not found at the first level storage structure, the look-up for the data is performed at the second level storage structure, and if the data is not found at the second level storage structure, the look-up for the data is performed at the main store.

10. The system in accordance with claim 9, wherein at least one of the look-up is based at least in part on a sorted dictionary.

11. The system in accordance with claim 9, wherein the look-up of the first level storage structure is based on an unsorted dictionary.

12. The system in accordance with claim 9, wherein the look-up of the second level storage structure is based on a sorted dictionary and an index.

13. The system in accordance with claim 9, further comprising merging, into a main dictionary that is sorted, a first dictionary for the first level storage structure and a second dictionary of the second level storage structure.

14. The system in accordance with claim 9 further comprising storing a new version of the data, when the first level storage structure receives a request comprising an update operation, an insert operation, or a delete operation.

15. The system in accordance with claim 14, further comprising storing the new version of the data, when the second level storage structure receives a bulk insert.

16. The system in accordance with claim 9, wherein the database comprises an in-memory database.

17. A non-transitory computer-readable storage medium including program code which when executed by at least one programmable processor causes operations comprising:
receiving a query for data stored in a database, wherein the database stores the data in accordance with a multi-level storage structure that includes a first level storage structure, a second level storage structure, and a main store, wherein the first level storage structure is configured to store at least a first data in a write-optimized logical row store, wherein the second level storage structure is configured to store at least a second data in a column store, and wherein the main store is configured to store at least a third data in a corresponding column store; and
in order to respond to the query, performing a look-up for the data in the multi-level storage structure, the look-up performed first at the first level storage structure, and if the data is not found at the first level storage structure, the look-up for the data is performed at the second level storage structure, and if the data is not found at the second level storage structure, the look-up for the data is performed at the main store.

18. The non-transitory computer-readable storage medium in accordance with claim 17, wherein at least one of the look-up is based at least in part on a sorted dictionary.

19. The non-transitory computer-readable storage medium in accordance with claim 17, wherein the look-up of the first level storage structure is based on an unsorted dictionary.

20. The non-transitory computer-readable storage medium in accordance with claim 17, wherein the look-up of the second level storage structure is based on a sorted dictionary and an index.

\* \* \* \* \*